Aug. 16, 1960
J. M. EITEL
2,949,279
CABLE GUIDING DEVICE
Filed Feb. 25, 1957
2 Sheets-Sheet 1
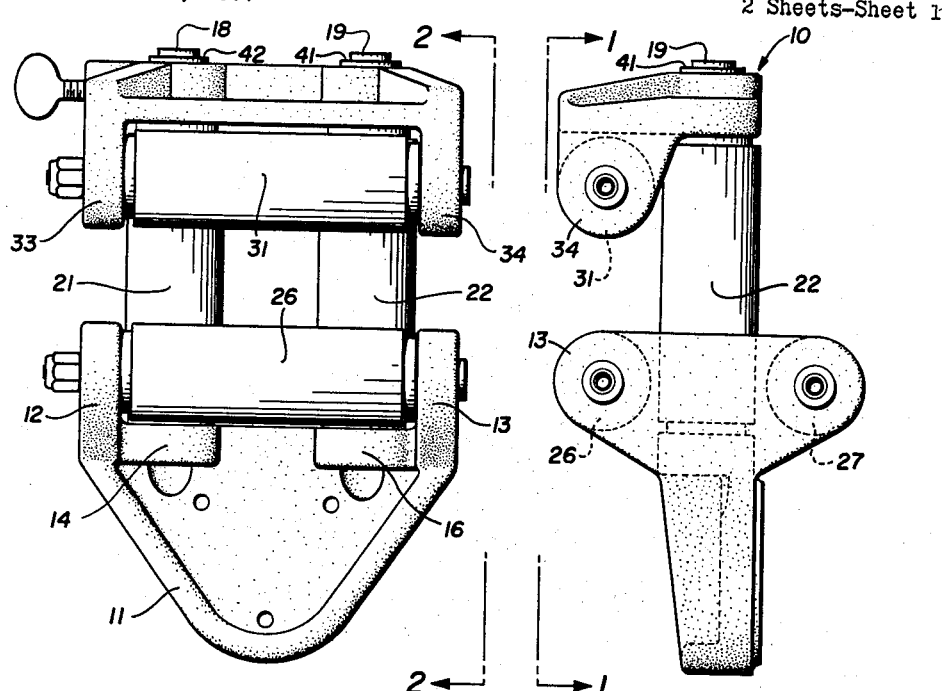
Fig. 1
Fig. 2
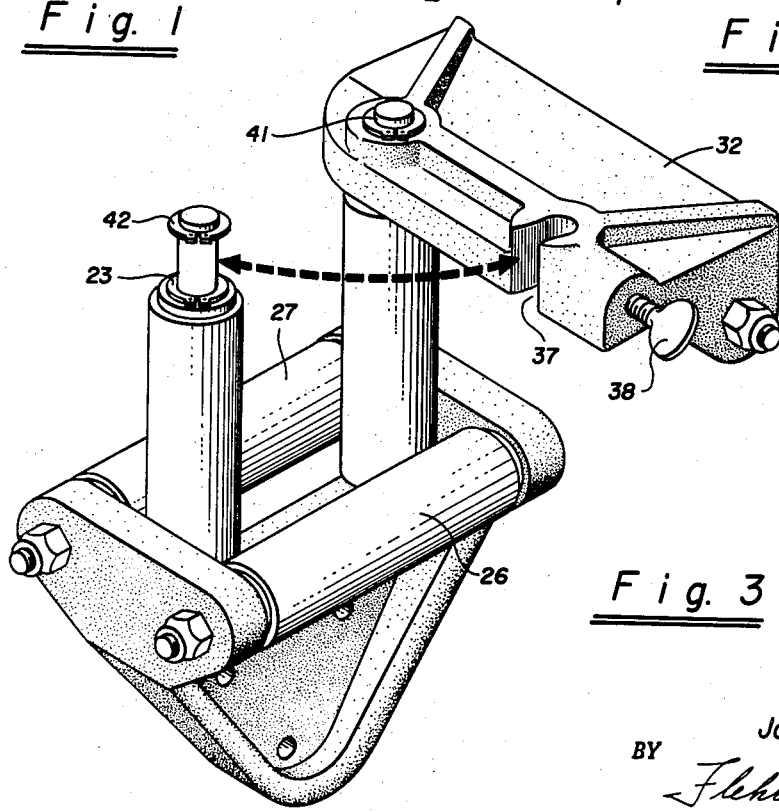
Fig. 3
INVENTOR.
Jay M. Eitel
BY
Flehr and Swain
Attorneys

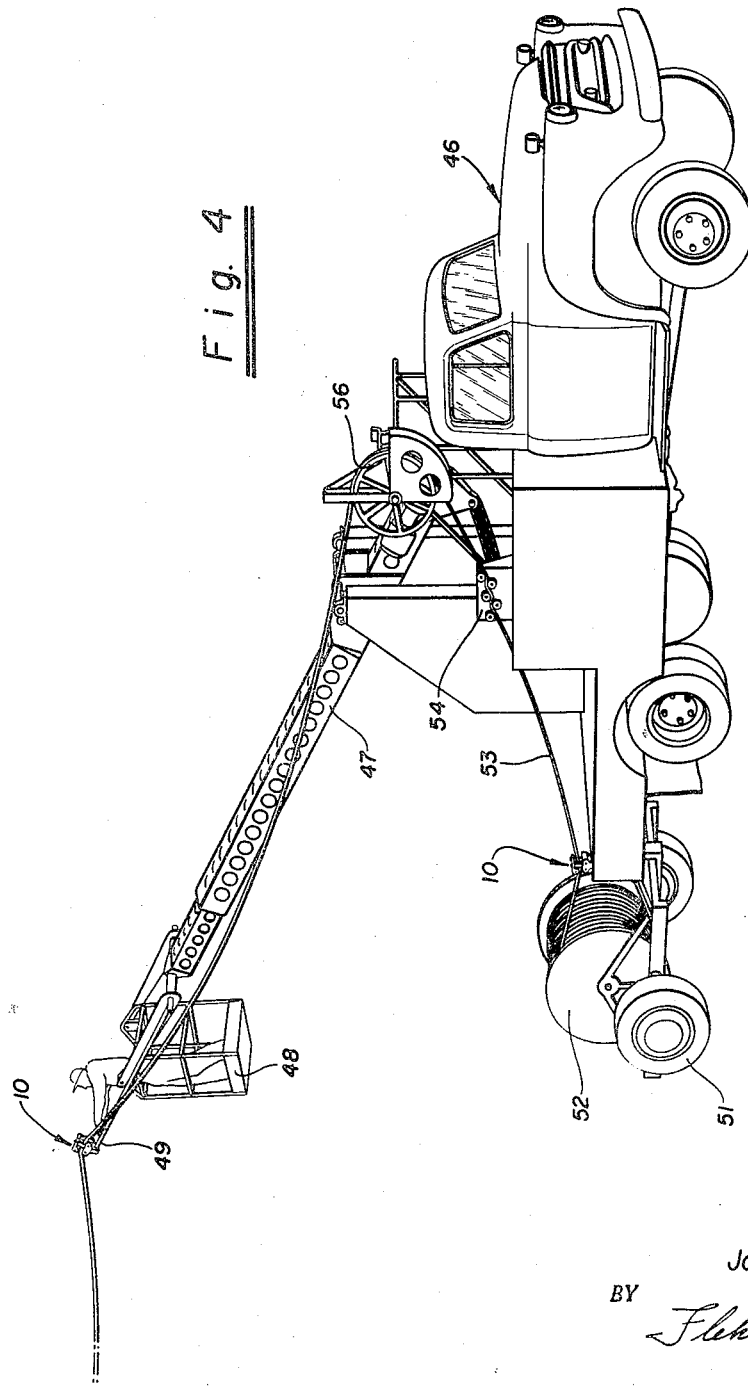

United States Patent Office 2,949,279
Patented Aug. 16, 1960

2,949,279
CABLE GUIDING DEVICE
Jay Miller Eitel, 235 Francis Drive, Los Altos, Calif.
Filed Feb. 25, 1957, Ser. No. 641,907
3 Claims. (Cl. 254—190)

This invention relates generally to a cable guiding device and more particularly to a cable guiding device for use in stringing wire, cable and the like.

Heretofore, cable guiding devices have not been particularly satisfactory expecially when stringing stranded wire. Stranded wire often becomes jammed within the device causing breaking of the wire or tearing of the insulation.

In general, it is an object of the present invention to provide a cable guiding device which is non-jamming and which is particularly suitable for use in stringing stranded wire.

Another object of the invention is to provide a cable guiding device of the above character in which the wire or cable can enter or leave the device at any angle without danger of jamming.

Another object of the invention is to provide a cable guiding device of the above character in which the wire or cable to be strung can easily be placed in operative relation with respect to the device.

Another object of the invention is to provide a rigid and strong guiding cable device of the above character which can take loading in any direction.

Additional objects and features of the invention will appear from the following description in which the preferred embodiment has been set forth in detail in conjunction with the accompanying drawing.

Referring to the drawing:

Figure 1 is a front elevational view of a cable guiding device taken along the line 1—1 of Figure 2 incorporating the present invention and showing the device in a closed position.

Figure 2 is a side elevational view taken along the line 2—2 of Figure 1.

Figure 3 is an isometric view of the cable guiding device shown in Figures 1 and 2 but showing it in an open position.

Figure 4 shows the cable guiding device in use in a cable stringing operation.

The cable guiding device 10 as shown in the drawing consists of a body 11 formed with extensions 12 and 13. The body is also formed with a pair of ears 14 and 16. A pair of spaced parallel shafts 18 and 19 have their lower ends fixed to the ears 14 and 16. Rollers 21 and 22 are mounted on the pins 18 and 19 and are held in position by snap ring washers 23.

In accordance with my invention, at least one roller which may be termed a third roller is mounted adjacent the lower ends of the rollers 21 and 22. However, in this instance, I have provided two rollers 26 and 27 which are rotatably carried by the body 11 between extensions 12 and 13. Rollers 26 and 27 are spaced substantially parallel and are positioned on opposite sides of the rollers 21 and 22. It will be noted that the ends of the rollers 26 and 27 are in adjacent overlapping relation to the lower ends of the rollers 21 and 22.

An additional roller 31 which may be termed the fourth roller is rotatably carried by a mounting member 32. The mounting member 32 is provided with depending portions 33 and 34 which serve to mount the roller 31. One end of the mounting member 32 is pivotally mounted on the end of the shaft 19 opposite the end which is fixed to the ear 16 of the body 11 to permit swinging movement of the member 32 and the roller 31 between a normal cable engaging and out-of-the-way, cable release positions of the same. Mounting member 32 is formed with a slot 37 adjacent its free end which is adapted to receive the end of the shaft 18. A thumbscrew 38 is threaded into the member 32 and is provided for releasably engaging the shaft 18 when the slot 37 is in engagement with the pin 18. A snap ring washer 41 serves to secure the pivoted end of the member 32 to the pin 19. Another snap ring washer 42 is mounted on pin 18 and serves to prevent movement of the member 32 longitudinally of the pin 18 when the free end of the member 32 is secured to the pin 18.

The use of my cable guiding device is shown in Figure 4. The cable stringing apparatus shown in Figure 4 consists of a self-propelled vehicle 46 upon which is mounted an extensible boom structure 47 which can be swung about a horizontal axis and rotated about a vertical axis. A workman's basket 48 is pivotally mounted on the end of the boom structure 47. One end of an arm 49 formed of a rod or pipe is fixed to the boom structure 47 and serves to mount one of my cable guiding devices 10.

Another of my cable guiding devices 10 is mounted on one side of the rear of the bed of the vehicle 46. Other equipment utilized in connection with the cable stringing apparatus is the cable trailer 51 which carries a drum 52 containing the cable 53. The cable 53 first passes through the cable guiding device 10 mounted on the bed of the truck and then passes through a suitable tensioning device 54, over a bull wheel 56 and then through the cable guiding device 10 mounted at the end of the arm 49.

Operation of my cable guiding device in connection with the cable stringing apparatus shown in Figure 4 may now be briefly described as follows: When it is desired to place the cable 53 from the drum 52 through the cable stringing apparatus shown in Figure 4, it first must be strung through or placed in the cable guiding device 10. If the free end of the cable is not available, this is accomplished by unfastening the thumbscrew 38 and swinging the member 32 and the roller 31 to what may be called an out-of-the-way or cable release position. The cable is then placed between the rollers 21 and 22 and the member 32 and the roller 31 swung to their normal cable engaging position. After the slot 37 has been moved into engagement with the pin 18, the thumbscrew 38 is tightened. The cable 53 is then passed through the tensioning device 54 and over the bull wheel 56 and through the cable guiding device 10 in a manner hereinbefore described. After the cable 53 has been properly tied off, the vehicle 46 may advance causing the cable to pass through the guiding device 10 from the drum 52. It is apparent that the cable 53 will readily pass through the guiding device 10 because no matter in which direction the cable passes through the device, the cable always will be in engagement with one of the rollers. Thus, the cable or wire can enter the guiding device at any angle without any danger of jamming. This is particularly advantageous when stringing cable which does not have a smooth outer surface such as stranded wire.

The construction of the device is such that it will take loading in any direction, that is top and bottom and sidewise loading. Top loading is permitted because the mounting member 32 is of a particularly rigid construction and because the mounting member 32 is firmly held in place by the snap ring washers 41 and 42 when the mounting member 32 and the roller 31 are in a cable engaging position.

It is to be understood that even though I call my device a cable guiding device, that it can be used in conjunction with any elongate member such as smooth wire, stranded wire, rope, messenger cable, lead covered cable, armored cable and the like.

It is apparent from the foregoing that I have provided a new and improved cable guiding device which is non-jamming and is of such construction that it can take loading in any direction.

I claim:

1. In a cable guiding device, a body, a pair of spaced substantially parallel pins mounted on said body, first and second rollers mounted on said pins, a third roller carried by the body at right angles to the first and second rollers, said third roller having its ends in adjacent overlapping relation to the corresponding ends of the first and second rollers, a fourth roller, a rigid mounting member serving to carry the fourth roller, one end of said mounting member being pivotally carried by one of the pins to permit swinging movement of the mounting member and the fourth roller in a plane at right angles to the axes of the pins between normal cable engaging and out-of-the-way release positions of the same, said fourth roller in cable engaging position extending parallel to the third roller and having its ends in adjacent overlapping relation with the other ends of the first and second rollers and in out-of-the-way position permitting an intermediate portion of a length of cable to be placed between the first and second rollers, and means releasably securing said mounting member to the other of said pins.

2. In a cable guiding device, a body, a pair of spaced substantially parallel vertical pins mounted on said body, first and second rollers mounted on said pins for rotation about vertical axes, a third roller carried by the body for rotation about a horizontal axis, said third roller having its ends in adjacent overlapping relation to the corresponding ends of the first and second rollers, a rigid mounting member having one end pivotally mounted on one of the pins to permit swinging movement of the mounting member in a horizontal plane, a fourth roller carried by the mounting member below the mounting member for rotation about a horizontal axis, and means carried by the mounting member for releasably engaging the other of said pins whereby when said mounting member is in engagement with the other of said pins, said fourth roller is in cable engaging position and has its ends in adjacent overlapping relation with the other ends of the first and second rollers and when said mounting member is out of engagement with said pin an intermediate portion of a length of cable can be placed between the first and second rollers.

3. In a cable guiding device, a body having a pair of horizontal ears lying in the same plane and a pair of parallel vertical extensions, a pair of spaced substantially parallel vertical pins mounted on said ears, first and second rollers mounted on said pins for rotation about vertical axes, a horizontal pin carried by said extensions, a third roller rotatably mounted on said last named pin for rotation about a horizontal axis, said third roller having its ends in adjacent overlapping relation to the corresponding ends of the first and second rollers, a rigid mounting member having one end pivotally mounted on one of said vertical pins to permit swinging movement of the mounting member in a horizontal plane, the mounting member having depending spaced parallel vertical portions, a horizontal pin carried by said portions, a fourth roller rotatably mounted on said last named pin for rotation about a horizontal axis, and means carried by the mounting member for releasably engaging the other of said vertical pins whereby when said mounting member is in engagement with the other of said vertical pins, said fourth roller is in cable engaging position and has its ends in adjacent overlapping relation with the other ends of the first and second rollers and when said mounting member is out of engagement with said other vertical pin an intermediate portion of a length of cable can be placed between the first and second rollers.

References Cited in the file of this patent

UNITED STATES PATENTS

| 977,277 | Dalgleish | Nov. 29, 1910 |
|---|---|---|
| 1,438,394 | Packer | Dec. 12, 1922 |
| 1,831,306 | Kakimoto | Nov. 10, 1931 |
| 2,188,715 | Ingram | Jan. 30, 1940 |
| 2,783,025 | Scheidt | Feb. 26, 1957 |

FOREIGN PATENTS

| 58,672 | Austria | Apr. 10, 1913 |
|---|---|---|
| 562,261 | Great Britain | June 23, 1944 |